May 9, 1944.  C. W. COLBY  2,348,610
HEATING SYSTEM OR THE LIKE
Filed Dec. 24, 1940  7 Sheets-Sheet 3

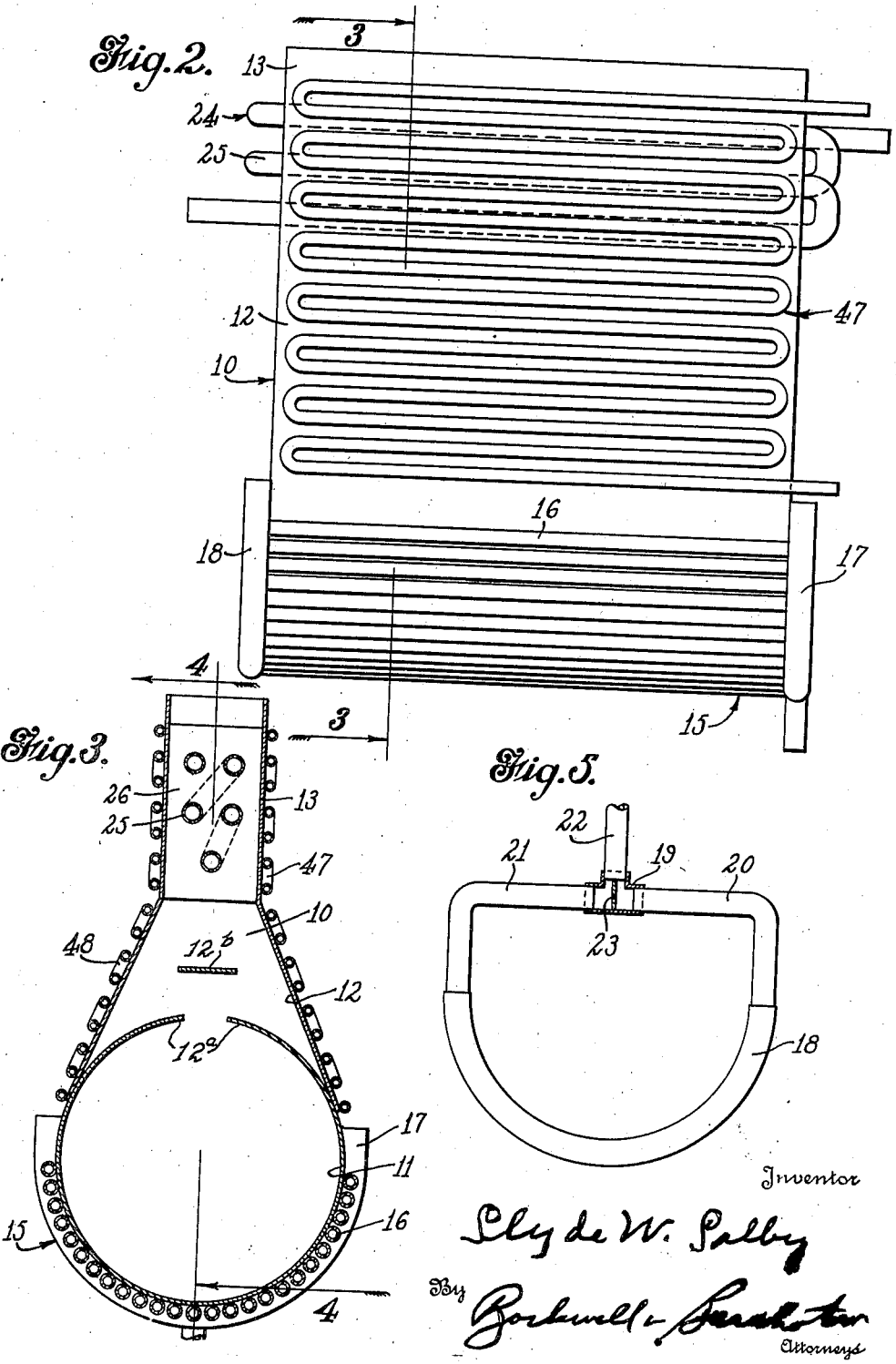

Inventor
Sly de W. Colby
By Rockwell Sinhotow
Attorneys

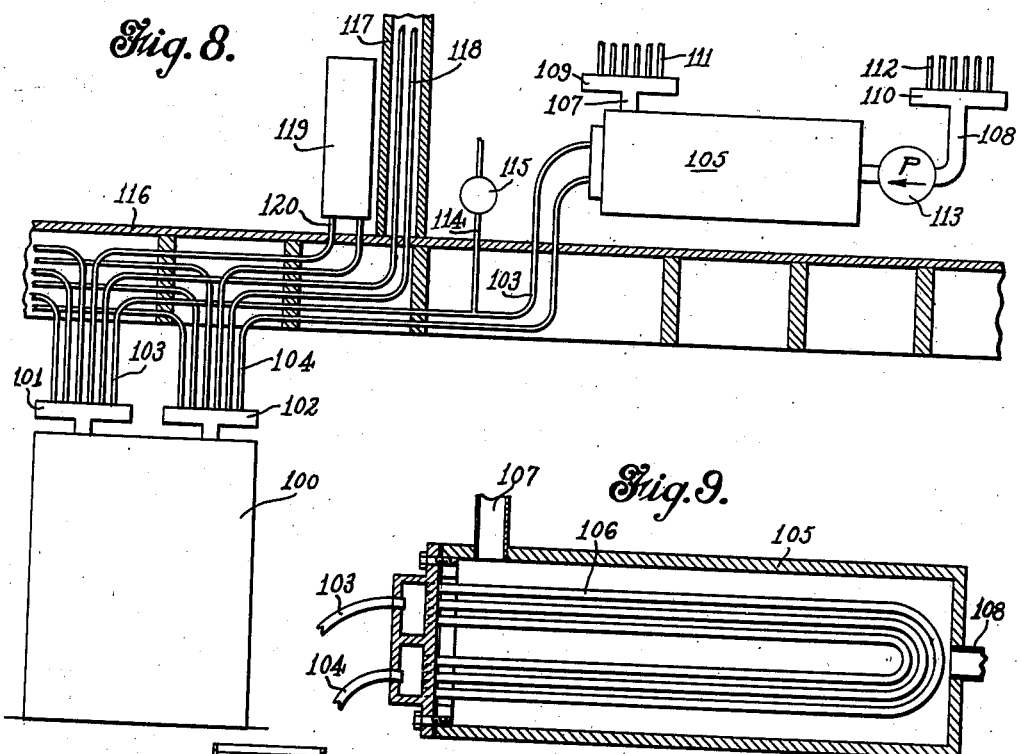
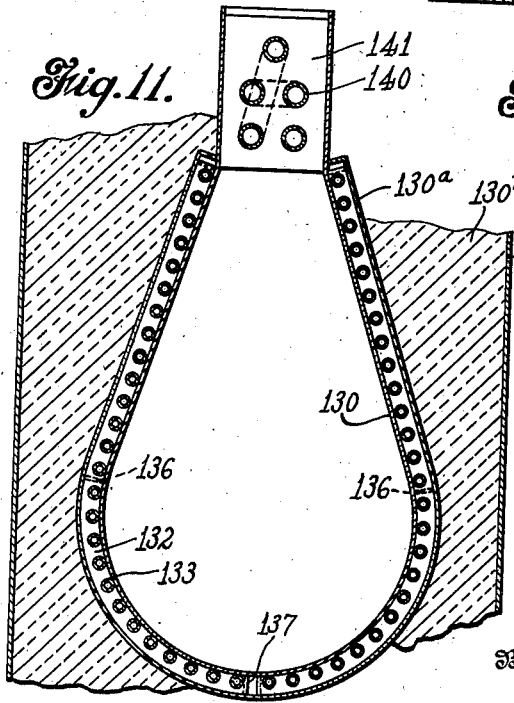
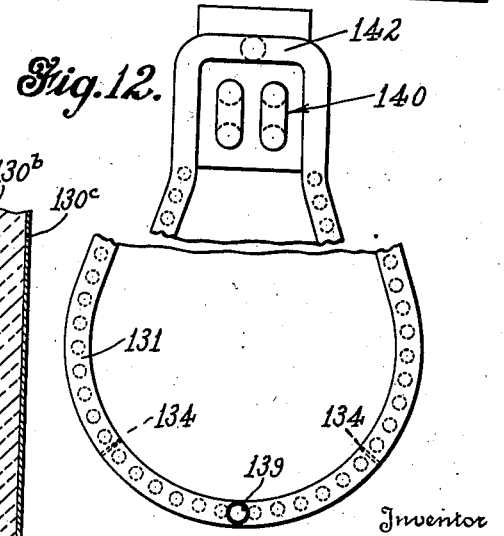

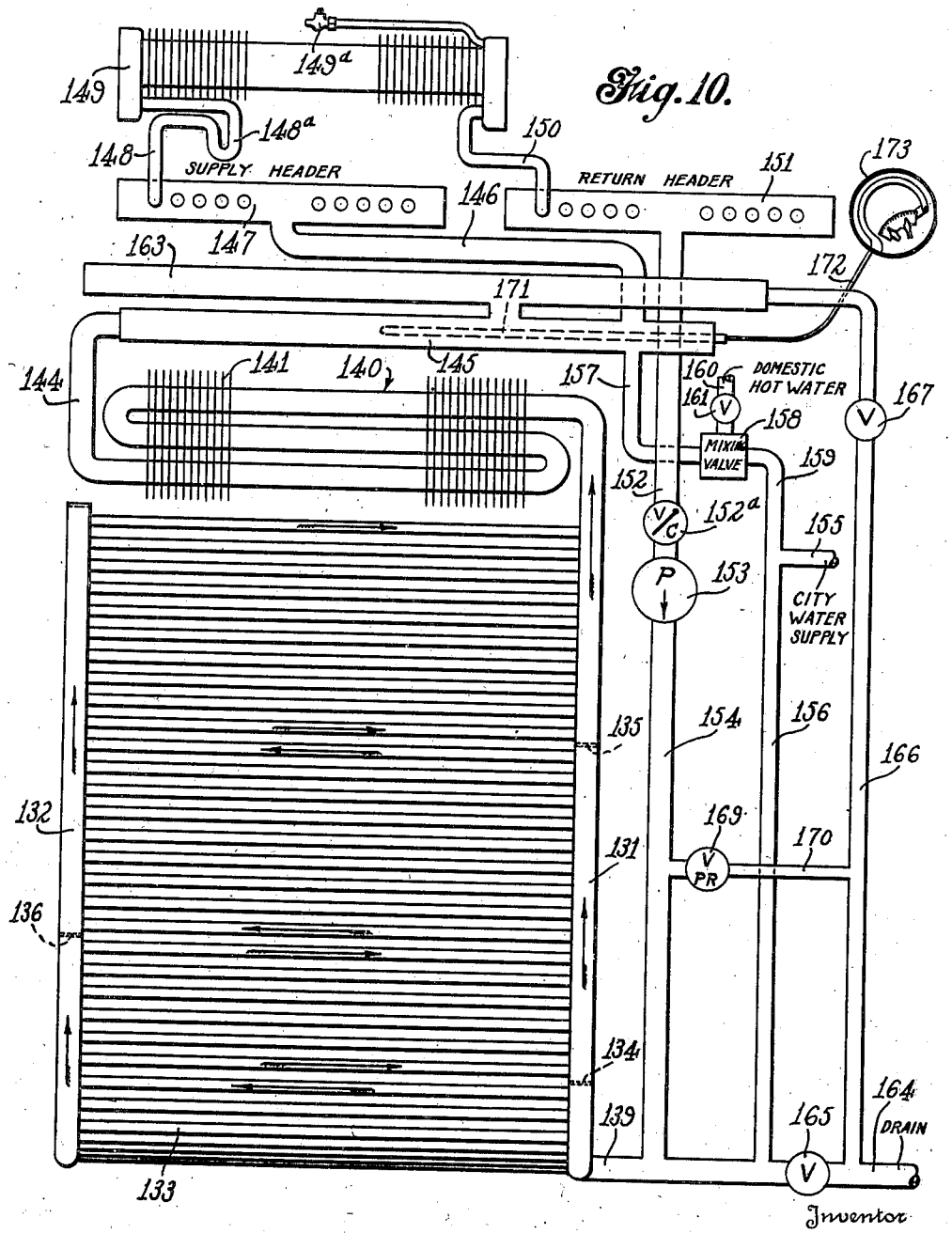

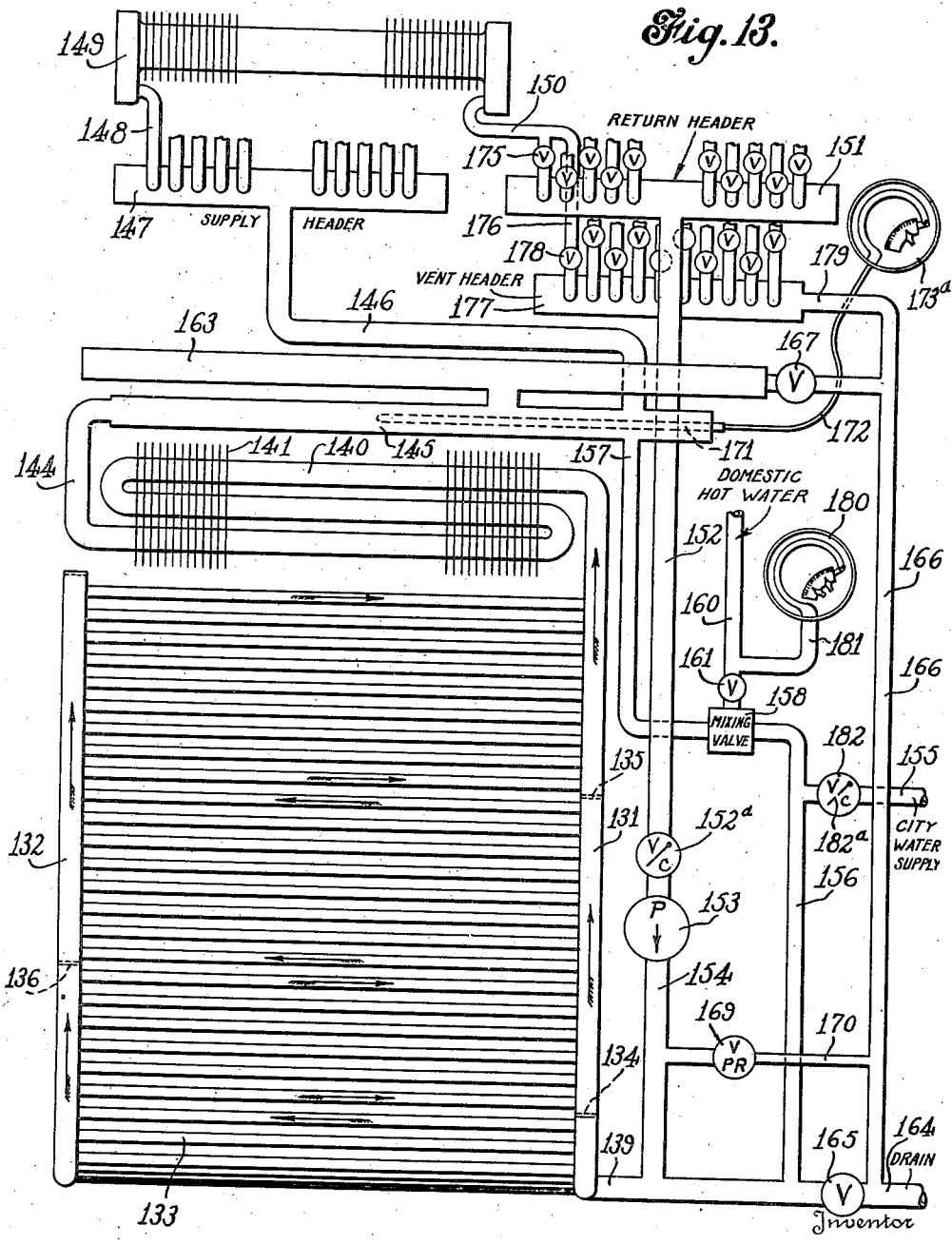

Patented May 9, 1944

2,348,610

UNITED STATES PATENT OFFICE 2,348,610

HEATING SYSTEM OR THE LIKE

Clyde W. Colby, Branford, Conn.

Application December 24, 1940, Serial No. 371,511

4 Claims. (Cl. 237—19)

This invention relates to heating systems, and while not limited to a particular use it is especially applicable to household heating systems, as it is contemplated to provide a heating system which will not only heat the building in which it is installed, but is so designed that hot water may be withdrawn from the system as desired for domestic use and other purposes.

In the usual heating system employing water or steam as the heating fluid, there is usually a considerable quantity of water in the system which is kept hot and which circulates through the radiator elements from which the heat is delivered to the rooms. Such systems are usually "closed" in that, while there ordinarily is a connection to a source of water supply, such as a city water system, for example, this connection remains closed by means of a valve and is only opened when it is desired to add additional water to the heating system.

In the present device there is provided a circuit or circulatory system to carry the heating fluid, which system includes the radiators or radiation elements, heating elements or elements containing the heating fluid which are exposed to the source of heat (in this instance an oil burner), and connections between the heating elements and the radiation elements. This circuit is constantly open to the city water system or other source of water supply, and the fluid is therefore at all times under the pressure obtained in such water supply. Also in the system is arranged a circulator or pump to bring about a differential of pressure within the system so as to secure a circulation or flow of water therethrough when heat is needed in the rooms served by the system.

In addition, connections are arranged from the system or circuit to hot water outlets from which hot water may be drawn as desired, the entire circuit being so arranged that the withdrawal of hot water does not bring about a circulation through the radiation elements in order that the heated water is not carried to the latter elements except when required. Moreover, the entire system contains a relatively small amount of water which may not be more than a few gallons for a small house, so that heat losses are very small as compared with what would be the case if the heating system were required to keep a large volume of water at a given temperature.

Further, the heating elements are so arranged as to obtain a maximum efficiency from the fuel, in that the heat chamber is surrounded by coils containing the water to be heated so that a relatively small amount of insulation is required upon the walls of the chamber within which the burner is mounted, and also a relatively small amount of heat escapes with the exhaust gases.

One object of the invention is to provide a novel and efficient heating system.

A further object of the invention is the provision of a heating system having a water circulating circuit which is constantly open to a source of water supply under pressure, whereby the water in the system may be withdrawn for domestic use or other purposes, as desired.

A still further object of the invention is the provision of a heating system of the character described, which will contain a relatively small amount of water and which water will be heated substantially instantaneously by an intermittently operating burner, such that whether domestic hot water is withdrawn from the system or whether the water is circulated through the radiators for heating the various rooms, it will always be delivered at a relatively high temperature even though it may enter the heating unit at a relatively low temperature.

A still further object of the invention is the provision of a heating system of the character described which shall be so controlled that the withdrawal of hot water from the system will not occasion a delivery of hot water to the radiators except when such delivery is desired.

Still another object of the invention is the provision of a heating system designed both for room heating and for the furnishing of domestic hot water, so arranged that, while the system is always open to a cold water supply, no water from such supply will enter the system except to replace hot water withdrawn therefrom.

To these and other ends the invention consists in the novel features and combinations of parts to be hereinafter described and claimed.

In the accompanying drawings:

Fig. 2 is a side-elevational view of the heat unit employed therein;

Fig. 3 is a sectional view on line 3—3 of Fig. 2;

Fig. 5 is an end view of the lower portion of the heating unit;

Fig. 8 is a diagrammatic view of my heating system adapted for the heating of a plurality of apartments from a central heater;

Fig. 9 is a sectional view through the casing of the heat exchange member;

Fig. 10 is a diagrammatic view of a modification of my improved heating system;

Fig. 11 is a sectional view through the heating or furnace unit;

Fig. 12 is an end view of the unit shown in Fig. 11, partly broken away;

Fig. 13 is a diagrammatic view of a further modified form of heating system;

As shown in Figs. 1 to 4 of the drawings, the heating system comprises a heat chamber 10 of the cross-sectional shape shown in Fig. 3. The lower portion of this chamber is substantially semi-circular, as shown at 11, and tapers inwardly and upwardly as at 12 to a reduced upper portion 13. The heat is furnished in the present instance by an oil burner, the casing of which is shown at 14, and which is directed to deliver a flame into the lower portion of the chamber 10. The chamber may be constructed of nichrome so as to withstand heating to incandescence. Within the chamber are baffles 12ª and 12ᵇ which tend to throw the heat outwardly toward the chamber walls. The usual blower or fan for the burner is shown diagrammatically at 14ª. I have found that the burner shown in the patent of Forrester L. Hammer, No. 2,222,031, granted November 19, 1940, is particularly efficient when used in connection with a heat chamber of this character.

Figure 1:
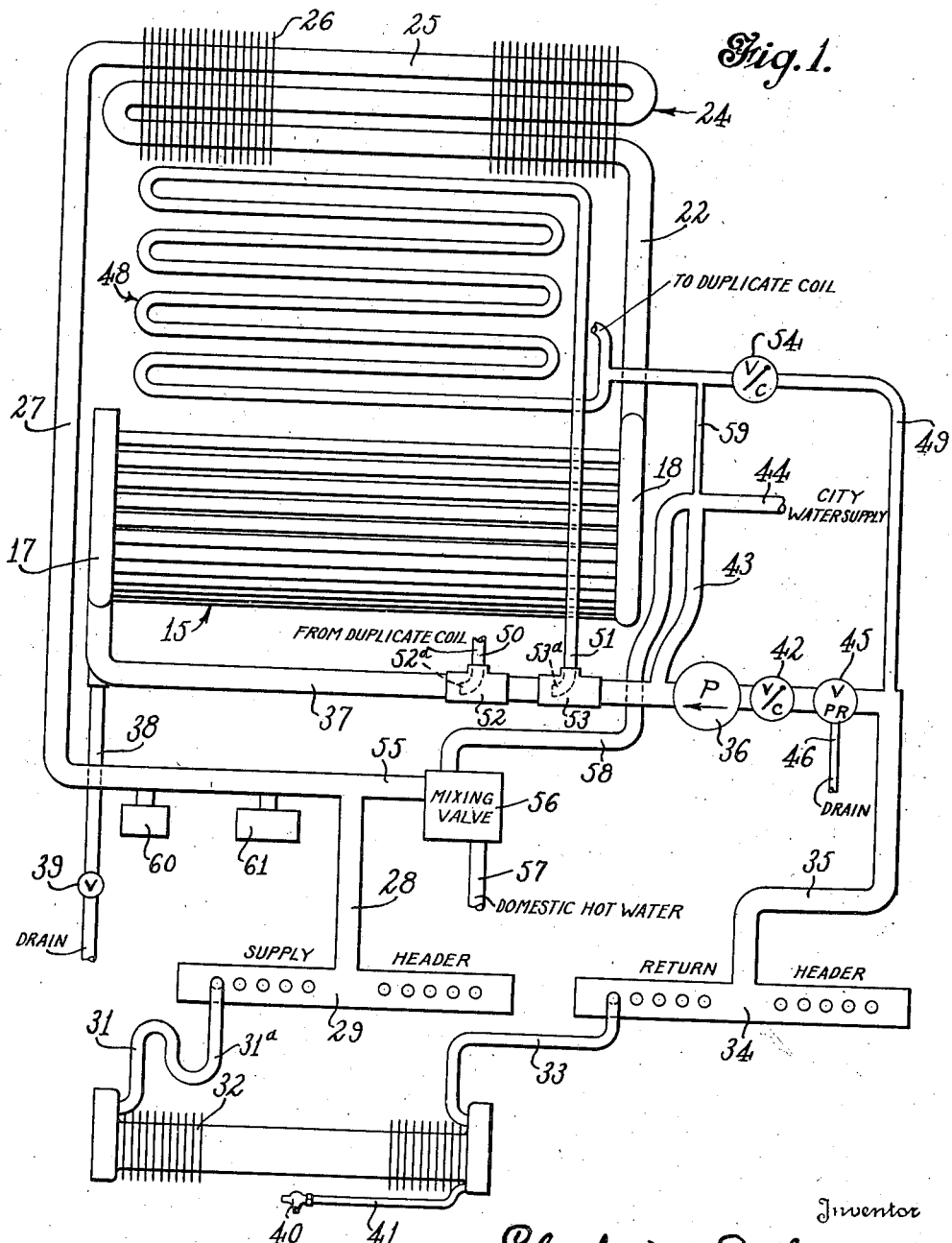
Fig. 1 is a diagrammatic view of a heating system embodying my invention.

The lower portion of the chamber is embraced by what may be termed a cradle coil 15, this coil consisting of a plurality of pipes 16 extending between and communicating at their ends with a pair of U-shaped pipes or headers 17 and 18. The header 17, as hereinafter explained, will be arranged for the inlet of cold water from the cold water supply and from the radiation elements or room radiators, while, as shown in Figs. 1 and 5, the upper ends of the header 18 are connected to a T 19 by pipes 20 and 21, from which T the water is carried by a pipe 22. In the T 19 a baffle 23 is provided to insure that the water passing inwardly through the pipes 20 and 21 will pass upwardly through the pipe 22 and not circulate about the header 18.

The pipe 22, as shown in Fig. 1, leads to a heating coil designated generally by the numeral 24 and situated within the upper reduced portion of the heat chamber. This coil consists of a number of runs of a pipe 25, circulating the water back and forth across this portion of the heat chamber. Five of such runs are shown in the drawings, although more or less may be used as required. These pipes may have fins 26 mounted thereon to gather the heat efficiently from the hot products of combustion and transfer it to the fluid within the coil 24.

From the coil 24 the heating fluid is led through pipes 27 and 28 to a supply header 29, from which individual pipes 31 lead to radiation elements 32 which may be room radiators. The supply headers 29 may be provided with any number of outlet pipes 31 depending upon the number of radiators required. The numeral 33 designates a return line from the radiators to the return header 34 and from this return header the heating fluid passes through a pipe 35 to a circulating pump 36 from which it is carried by the pipe 37 to the inlet header 17 of the cradle coil 15 to complete the circuit. A drain 38 may be provided at a lower portion of the system, such as the pipe 37, the drain being provided with a valve 39 which may be opened to drain the entire system if and when required. Also the radiators 32 may be provided with vent valves 40 at the upper end of upstanding pipes 41 so that any air which collects in the system may be vented.

At the inlet side of the pump 36 is provided a check valve 42 which opens toward the pump and which prevents the flow of water in a reverse direction. This valve also has sufficient resistance to opening so as to prevent a gravity flow of the heating fluid through the system due to difference in temperature existing therein, so that there will be no delivery of hot water to the room radiators unless the pump 36 is in operation, even though the burner 14 may operate to heat the water.

The pipe 37 is connected through pipe 43 to the city water supply 44, this connection being open at all times. There is, however, during the heating cycle of the system (i. e., when no domestic hot water is being drawn therefrom) no passage of cold water from the water supply into the system due to the arrangement which provides for a complete circulation of the water within the system by reason of the pressure differential created by the circulating pump 36. In other words, a complete circuit is provided through which the water is carried by the circulating pump, this circuit being in communication at all times with the city water supply, and therefore at all times under the pressure obtained in this supply. As the entire circuit is under this pressure, however, the circulating pump acts in the same manner as if no pressure were present. That is, the pump simply creates a pressure differential at the inlet and outlet thereof which brings about the circulation of the water without reference to the opening to the city water supply.

A pressure relief valve 45 is provided in the return pipe 35 to permit water to vent from the system in the event of the pressure building up beyond the safety limits. A pipe 46 will lead from this valve to any suitable drain.

A further heat element is arranged in parallel with the heating coils 15 and 24. This heat element comprises the coils 47 and 48 arranged upon each side of the walls of the heat chamber 10 above the coil 15. These coils absorb the heat delivered to the chamber walls so as to cool the chamber and thus reduce the amount of insulation required, and at the same time employ this heat in a useful manner to heat the water in the system. As shown in Fig. 1, the heating fluid enters these coils through a pipe 49 connected to the pipe 35 and also connected to the inlet ends of the coils 47 and 48. The outlet from these coils delivers to the pipe 37 by means of outlet pipes 50 and 51 passing through openings in the T's 52 and 53 and having their end portions in the pipe 37, as shown at 52ª and 53ª, so that the flow of water through the pipe 37 has an aspirating or entraining action upon the pipes 50 and 51 to draw the water therefrom.

It will be noted that the circulating pump does not move the heating fluid directly through the auxiliary coils 47 and 48, but indirectly causes the water to flow through these coils by means of the described entraining or aspirating action of the water circulating through the pipe 37. The water drawn from the coils 47 and 48 through the pipes 50 and 51 into the pipe 37 will be replaced by the water returning from the return header 34 through the pipe 49. In order to prevent the back flow through the pipe 49 a check valve 54 may be arranged in this pipe, as indicated in Fig. 1.

It will be apparent that I have arranged for particularly efficient operation of the burner 14 in that the gases of combustion are discharged into the heat chamber 10, which chamber is practically surrounded by heating coils all of which contribute to the heating of the water in the system, the coil 24 being arranged at the top of the chamber to draw the heat from the gases leaving the chamber. Practically instantaneous heating of the water is accomplished.

Provision is also made for the withdrawal of water from the system for use as domestic hot water or other purposes. To this end the pipe 27 leading to the supply header 29 is provided with a branch 55 leading to a mixing device 56 from which the domestic hot water is drawn as at 57. It will be understood that the water in the system will in some cases be at too high a temperature for use, and the water is thus led into the mixing device 56, where it is mixed with cold water entering the mixing device through the pipe 58 which communicates with the cold water supply pipe 44. The mixing device will preferably be thermostatically controlled to deliver water at the faucet at a predetermined temperature.

When domestic hot water is drawn from the system through the pipe 57 this water will be replenished by the entry of water through the pipe 43, this water passing through the pipe 37 to the heat elements 15 and 24 and downwardly through the pipe 27 to the mixing device to complete the circuit. It will be seen, therefore, that the withdrawal of domestic hot water from the system does not cause a flow of hot water through the room radiators, which, together with the circulating pump, are "short-circuited" at this time. It will be obvious, however, that there is a flow of water through the pipe 37 during the withdrawal of domestic hot water, which, by the previously described entraining or aspirating action, will cause a flow of water through the coils 47 and 48. The water thus taken from these coils is replenished by means of a pipe 59 connected to the supply pipe 44 and to the inlet of the coils between them and the check valve 54. Thus, any water drawn from these coils through pipes 50 and 51 during withdrawal of domestic hot water through pipe 57 will be supplied through the pipe 59, and thus these auxiliary coils 47 and 48, as well as coils 15 and 24, will be employed in the domestic hot water cycle of the system as well as in the heating cycle of the system.

It will be obvious from the above description that the heating system will operate either to deliver hot water to the radiation elements or to deliver domestic hot water when required without regard to the furnishing of heat to the radiators. It may, therefore, be said to have a heating cycle and a domestic hot water cycle, and it will be necessary to operate the burner during each of these cycles.

To effect this result, automatic thermostats or so-called "aquastats" 60 and 61 are placed in the circuit preferably at a point between the heating coils and the supply header and mixing device, as, for example, in the line 27, as shown in Fig. 1 of the drawings. The aquastat 60 is designed to operate during the hot water supply cycle of the burner and acts as an upper limit control to shut off the burner in the manner usual in the art when the temperature of the water has reached a predetermined figure, as well as to start operation of the burner when the water in the system falls to a predetermined temperature. It will thus be seen that the water in the system is always maintained at a predetermined temperature, but due to the arrangement of the check valves 42 and 54, no hot water will be delivered to the room radiators unless and until the circulating pump is set into operation.

The aquastat 61 is set to permit a higher temperature than the aquastat 60, and is designed to act during the room heating cycle of the system and is arranged to operate in conjunction with a room thermostat 62 (Fig. 7), arranged in one of the rooms of the building to be heated, in the usual manner, which room thermostat is designed to control the operation of the burner and also control the circulating water pump and start or stop these devices, depending upon whether or not heat is called for by the temperature of the room in which the thermostat is located.

In other words, when this thermostat calls for heat in the house, the pump 36 will be set into operation, causing a flow of water through the heating circuit, including the room radiators, and the burner will also be set into operation and effect instantaneous heating of the water in the system so that hot water will be delivered to the radiators. When the room containing the thermostat is brought up to the required temperature, the thermostat will operate to stop the action of the circulating pump and shut off the oil burner.

A similar action takes place when no heat is required for the house but when domestic hot water is drawn from the system, except that at this time the circulating pump is not in operation. It will be understood that as described the aquastat 60 maintains a predetermined degree of temperature in the system, and when domestic hot water is drawn and the temperature of the water thus lowered by the intake of cold water through the pipe 44 from the city water supply system, the burner will be set into operation and thus heat instantaneously the water entering the system for withdrawal at the faucet. When the withdrawal is stopped and the water is raised to the temperature at which the upper limit of aquastat 60 is set, the burner will be again shut off.

Figure 7:
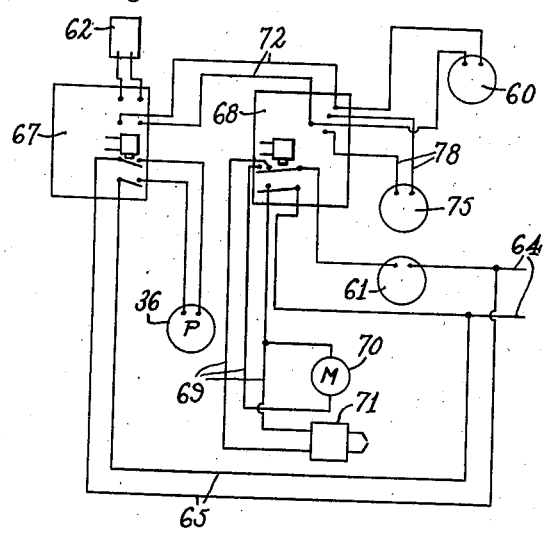
Fig. 7 is a diagrammatic view of the electrical devices and connections.
Figure 6:
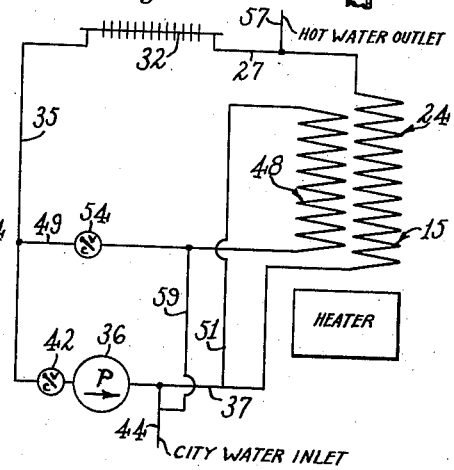
Fig. 6 is a diagrammatic view of the circuit of the heating system on a small scale.

In Fig. 7 of the drawings the electrical connections to the various control devices are shown somewhat diagrammatically. Electrical conductors 64 lead to a source of current, and from these conductors a branch circuit comprising the wires 65 leads to the circulator 36 through a relay 67. The wires 64 lead through the aquastat 61 to a second relay 68, which controls through the wiring 69 the motor 70 of the oil burner and the ignition 71 of this burner. The aquastat 60 is adapted to close the circuit through wires 72, which wires control the relay 68, which as stated will close the circuit through the burner ignition and motor. The wires 72 also lead to the room thermostat 62 so that the circuit through these wires may be closed by the room thermostat as well as by the aquastat 60. It will be understood that the room thermostat 62, in addition to closing the circuit through the wires 72 to operate the relay 68, also operates the relay 67, which closes the circuit to the circulator or circulating pump 36.

When the room thermostat 62 calls for heat in the room in which it is located and closes the circuit 72, it also operates the relay 67. Thus the circuit is closed through the motor and ignition of the burner and also through the circulator, so that the burner is caused to operate and the circulating pump is set into operation to cause an immediate circulation of the water through the pipes. This condition obtains until the thermostat is satisfied and breaks the circuit, except that if the temperature of the water in the heater reaches the limit at which the aquastat 61 is set, this aquastat breaks the circuit through the relay 68, and thus stops the oil burner. It will also be noted that at this time the aquastat 60, which is in control during the domestic hot water heating cycle of the burner, will be shunted as the circuit 72 which it controls remains closed under the action of the room thermostat. As the aquastat 61 is set at a higher limit than the aquastat 60 (a higher water temperature being desirable during the heating cycle of the burner than during the hot water cycle thereof), this shunting of the aquastat 60 leaves the aquastat 61 in control, as is desirable.

If the burner is not in operation, and domestic hot water is drawn from the system, the lower temperature limit of the aquastat 60 will be reached by the water in the system, and this device will operate to close the circuit 72, and thus operate the relay 68 to set the oil burner into operation. The burner will continue in operation until the water temperature reaches the upper limit at which the aquastat 60 is set, at which time the circuit 72 will be broken and the operation of the burner will cease. It is thus seen that the aquastat 60 maintains the water in the burner at a temperature between the upper and lower limits at which it is set, regardless of whether or not any water is used, or whether or not any heat is used in the rooms, as this device is in control at all times except when it is shunted by the action of the room thermostat 62.

If it should occur that when the burner is started the fuel fails to ignite for any reason, it is necessary to stop the motor 70 of the oil burner. This function is performed by a so-called "Visaflame" control (such as shown, for example, in United States Patent No. 2,162,098), shown diagrammatically at 75 in Fig. 4, which "Visaflame" is secured adjacent the burner casing 14, and provided with a tube 76 which extends into the combustion chamber 10 so as to be actuated by the light of the flame. It is desirable that this member not become overheated, and to prevent this an air tube 77 leads from the casing 14 of the burner to the tube 76, so that a small amount of air from the blower 14 will pass through the tube 76 to the combustion chamber, and thus keep the "Visaflame" device cool. This control member 75 is shown on the diagrammatic view of Fig. 7, and a circuit 78 leads from this device to the relay 68 to open the circuit through the relay and thus cut off the motor of the burner.

In Figs. 8 and 9 of the drawings I have shown a heating system similar to that described above, except that it is adapted for the heating of an apartment house from a central system, in that, while a single heater is provided, arrangement is made to supply a plurality of separate circuits from this heater, each of these circuits having provision for delivering hot water to room radiators, and provision is also made for supplying domestic hot water to each apartment.

In this modification the heater is shown diagrammatically at 100, which heater may supply hot water to return and supply headers 101 and 102. The pipes from these headers lead to the various apartments to be heated, and it is believed that it will be necessary to illustrate and describe only one of such apartment heating systems, although it will be understood that as many as desired may be employed up to the capacity of the heater. As illustrated, pipes 103 and 104 lead to a heat exchange member 105, there being one such heat exchange member for each apartment or separate heating circuit. This heat exchange member consists of a container or drum within which is disposed a coil 106 supplied by the pipes 103 and 104. The drum of the heat exchange member is filled with water about the coil 106, and this water is heated by the coil 106 and delivered to the various radiators throughout the apartment by means of a supply pipe 107 and a return pipe 108 leading, respectively, to the supply and return headers 109 and 110. From these headers the supply and return pipes 111 and 112 lead to the individual radiators. A circulating pump 113 is provided in the return line 108, there being one of these circulating pumps for each of the individual heating systems, or each of the heat exchange members 105.

It will be understood that the heating unit 100 is similar in all respects to the heating unit shown in Fig. 1 of the drawings, and provided with the same control devices as shown and described in connection with the single unit system, and that the usual thermostat will be employed in each of the apartments heated through one of the heat exchange members 105. This thermostat will be arranged, when the circuit is completed therethrough, to control the operation of the heater and also the circulator, as shown in Figs. 1 and 7 of the drawings, and in addition the thermostat will start the circulator 113 pertaining to the system of that particular apartment, so as to circulate hot water through the pipes 111 and 112 and to the radiators (not shown). It will be apparent, therefore, that this heating system acts precisely in the manner of the one shown in Figs. 1 to 7 of the drawings, except that the hot water, instead of passing from the headers 101 and 102 to the hot water radiators, passes to the heat exchange member 105, from which the water is circulated to the individual radiators.

To supply domestic hot water to the apartments, a pipe 114 leads to that apartment from the return pipe 103 leading from the heater to the coil 106. It may here be stated that a peculiar advantage is obtained from connecting the pipe 114 to the return pipe 103, in that the water entering the system from the city water supply and passing into pipe 114 must pass through the coil 106. As this water may be cooler than the water in the heat exchange member about the coil, a reversal of the heat cycle will take place, and the water within the coil will absorb heat from that around it until the two reach the same temperature. Thus the radiator water assists in heating the domestic water in this cycle.

The pipe 114 leads to a mixer shown diagrammatically at 115, wherein sufficient cold water is mixed with the hot water to deliver water at the faucets at any predetermined temperature.

In Fig. 8 of the drawings the floor of an apartment building is illustrated at 116, and a partition at 117 within which pipes 118 may lead to another apartment. If desirable, one or more hall radiators 119 may be provided, which hall radiators receive hot water from pipes 120, also leading to the return and supply headers 101 and 102.

In Figs. 10 to 12 of the drawings I have shown a modified form of my invention similar in principle to the form previously described. In the present case, however, the heating unit itself is so arranged that the heating coils at the side of the burner casing are in series instead of being in parallel, as shown in Figs. 2 and 3. Also, as will be apparent from the following description, certain changes have been made in the manner of arranging and connecting the various units of the system, as shown in Fig. 10.

In this embodiment of my invention a heat chamber 130 is provided generally similar in shape to that of the chamber shown in Fig. 3. The wall of this chamber will be formed of some heat-resisting material, such as nichrome steel, so that it will withstand being heated to incandescence. Arranged upon the outside of this chamber and at the ends thereof are headers 131 and 132, these headers being of horseshoe shape and following the outline of the cross-sectional shape of the burner chamber. These two members 131 and 132 are connected by a plurality of pipes or tubes 133 extending horizontally therebetween and arranged in parallel spaced relation over the entire wall of the heat chamber, so that the members 131 and 132 serve as headers connected by these tubes. In the header 131 are arranged a plurality of stops, shown at 134 and 135, and similar stops 136 are arranged in the header 132 in staggered relation to those in the opposite header. As shown in Fig. 11, the header 132 is divided at the bottom as at 137, so that it in reality consists of two separate parts, one at each side of the chamber. The header 131 is provided with an inlet pipe 139 through which cold water enters to pass through the coils and be heated thereby. It will be understood that heat is supplied to the chamber 130, and for this purpose an oil burner may be employed, as indicated, for example, in Fig. 4. On the outside of pipes 132 may be placed a cover 139ᵃ so that the pipes lie between this cover and the wall of the chamber 130. This will enable the placing of insulating material 139ᵇ between the heat unit and the cabinet 130ᶜ within which the heat chamber and burner unit may be placed.

Water entering the header 131 through the pipe 139 will, as may be seen from Fig. 12, divide and flow in both directions to rise against the stops 134. It will then pass horizontally through the tubes 133 to the header 132, in which it will rise until it strikes the stops 136. It will then pass back again to the header 131, and rising against the stops 135, will again be passed to the header 132. It will then rise to the top of the header 132 and again pass horizontally to the upper ends of the header 131. Mounted within the upper portion of the chamber 130 is a heat exchange coil designated generally by the numeral 140. This coil consists of a number of runs of pipe upon which are mounted radiating fins 141, so that the maximum amount of heat will be drawn from the hot gases issuing from the chamber 130, these gases passing to the flue after passing over the heat exchange coil 140. It will be apparent from Fig. 12 that the upper ends of the header 131 are brought together as at 142, and lead into a pipe 143 which is the inlet pipe of the coil 140.

The heat exchange member 140 may consist of any number of coils, five being shown in the drawings, the water passing through these coils in series, and issuing therefrom through the pipe 44 into a cylindrical chamber 145, from which it passes through the pipe 146 to the supply header 147.

From the supply header the hot water passes through pipes 148 to room radiators 149 (only one of which is shown in the drawings), and returns from these radiators through pipes 150 to the return header 151. From the return header 151 a pipe 152 leads to the inlet of a circulating pump 153, which delivers through the pipe 154 to the inlet 139 of the heating coil, thus completing the circuit.

The present system, as in the case of the one previously described, is open at all times to the city water system, and is also so arranged that domestic hot water may be drawn therefrom. The connection with the city water supply is shown at 155, from which connection a pipe 156 communicates with the pipe 139. The domestic hot water is drawn from the chamber 145 through the pipe 157, which leads to a mixing valve 158, which valve also receives cold water from the city water supply through the pipe 159. It will be understood that the mixing valve may be regulated to deliver domestic hot water through the pipe 160 at any desired temperature, the latter being obtained by the mixing of more or less cold water from the city water supply with that drawn from the chamber 145 of the heating circuit. The flow through the pipe 160 may be controlled by a regulating valve 161, which valve may be adjusted to give the amount of water desired in a given time.

Adjacent the chamber 145 and in communication therewith is an expansion chamber 163 to permit the expansion of the water against a confined quantity of air. The heating circuit may be provided with a drain 164, this drain being normally closed by the valve 165, and the drain may also be connected by a pipe 166 through a valve 167 to the expansion chamber 163, so that the latter may be "blown out" when desired.

In order that the pressure in the heating circuit will not become too high, a pressure relief valve 169 may be provided in a line 170 which extends from the pipe 154 to the pipe 166, so that it will communicate with the drain 164 beyond the valve 165, which valve, as stated, is normally closed.

Figure 4:
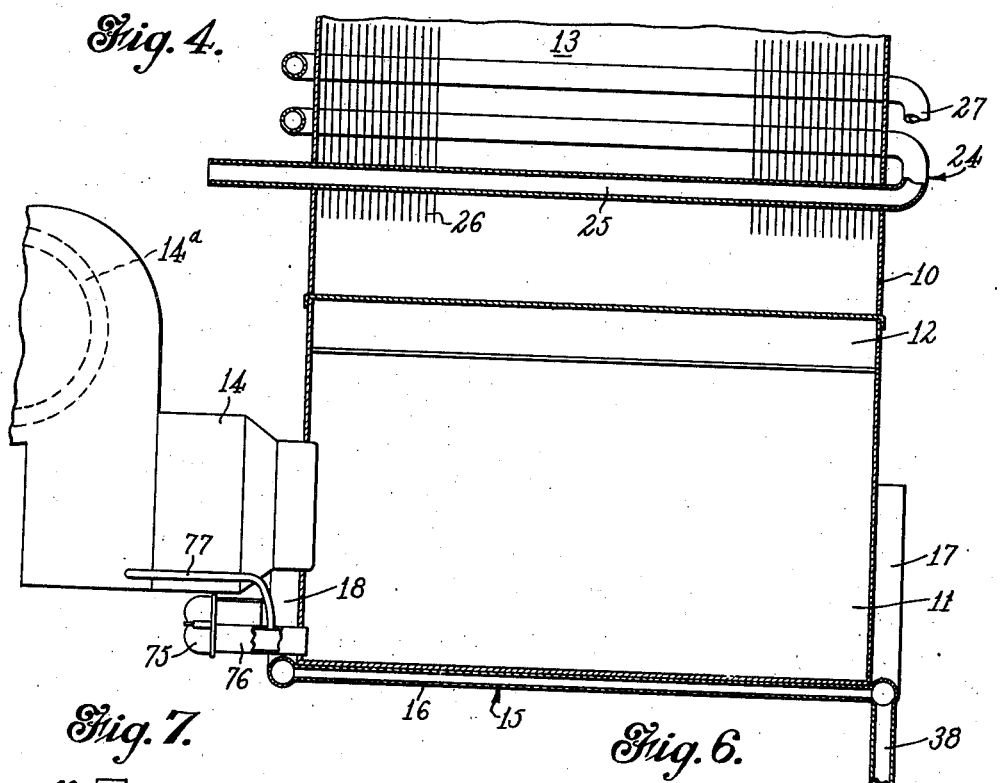
Fig. 4 is a sectional view on line 4—4 of Fig. 3.

As previously stated, the heat for the heating system may conveniently be supplied by an oil burner delivering its flame into the chamber 130. As in the present modification, as well as in that previously described, the capacity of the heating element (the coils receiving heat from the chamber 130) is very small, there will be a very small quantity of water present in the entire system. For this reason it is necessary to employ controls for the oil burner of such a nature that it will be in readiness to "cut in" or start in a very short time after it has cut out. For this reason I prefer to employ a "Visaflame" control to cut off the fuel in the event that there is a failure in ignition of the fuel, as shown in connection with Fig. 4 of the drawings, which will cut off the motor of the oil burner if it is not energized from the light of the flame in the heating chamber. As this device must be set close to the heating chamber, it will be found desirable to prevent the heating of this device by conduction from the furnace by delivering thereto cold air from the blower of the burner, as shown in Fig. 4.

As domestic hot water is drawn from the heating system, it will be desirable to maintain the temperature of the water therein between certain limits at all times. For this purpose a fluid thermometer or thermostatic element 171 is placed in the chamber 145 so as to be subject to the temperature of the water therein. The fluid within the member 171 communicates through a tube 172 with a control 173, which will serve as both upper and lower limit control of the system. That is, when the water falls below a given temperature, the control 173 will be actuated to set the oil burner in operation, and when the upper limit is reached at which the control is set, the current to the burner will be cut off in a well-known manner to stop the operation of the burner until the temperature of the water again drops below the lower limit of which the control device is set.

It will be understood that the control device 173 operates only to maintain the water in the system at a given temperature, and that this does not of itself serve to deliver water to the room radiators. The latter is accomplished by means of the pump 153, which will preferably be electrically driven and controlled from a thermostat located at a proper point in the dwelling or other building or room to be heated, in the usual manner.

When the temperature of the room in which the thermostat is placed reaches the lower limit at which the thermostat is set, the circulator will be started and cause hot water in the system to circulate through the room radiators, and this circulation will continue as long as the room thermostat calls for heat. If during this period the temperature of the water in the heating system falls below the minimum setting of the control 173, the burner will be set into operation and will continue until the water temperature in the chamber 145 reaches the maximum limit of the control 173. It will also be understood that even though the room thermostat does not set the circulating pump 153 into operation, the control 173 will, nevertheless, maintain the water in the system at a given temperature, whether this temperature is reduced by mere radiation or whether it is reduced by the drawing of domestic hot water therefrom. As a result, hot water of the desired temperature is always present in the system, both for domestic use and for circulation through the radiators if the latter is required.

In order to prevent a reverse flow of water through the system, particularly during the drawing of domestic hot water therefrom, a check valve 152ª is placed in the pipe 152 at the inlet side of the circulating pump 153, this check valve operating to freely permit the flow of water in the direction induced by the pump, but preventing flow in a reverse direction. Also some means may be employed to prevent a gravity flow of hot water through the radiators when the room thermostat does not set the pump into operation. This is necessary, for example, to prevent a summer circulation through the radiators when no heat is required, but when the water in the heating coils will be kept hot for domestic hot water purposes. This may take the form of traps 148ª, one of which may be located in each of the pipes 148 supplying the heating fluid to the radiators. A similar trap 31ª may be employed in each of the pipes 31, as shown in Fig. 1 of the drawings, for the same purpose. It will be found that the resistance offered by such a trap will overcome the gravity circulation of the heating fluid, so that the latter will not circulate except when the circulating pump is set into operation.

Figure 14:
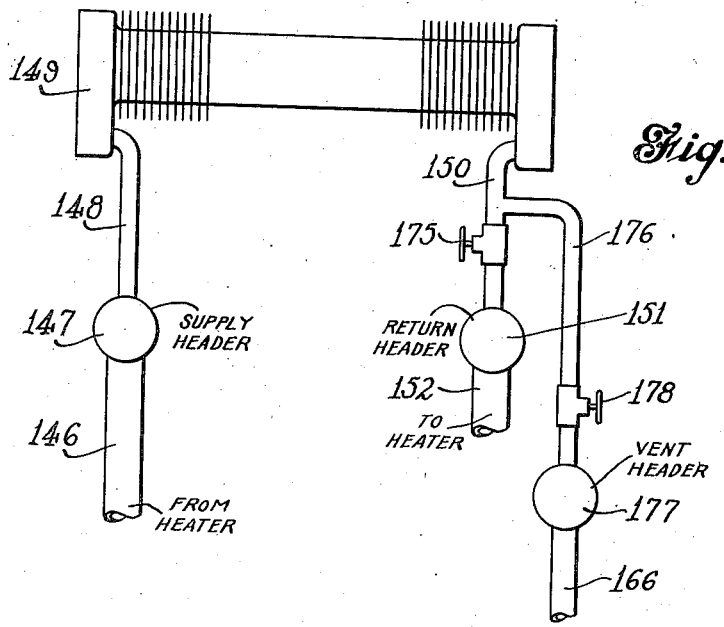
Fig. 14 is a detail view of a part of said system.
Figure 15:
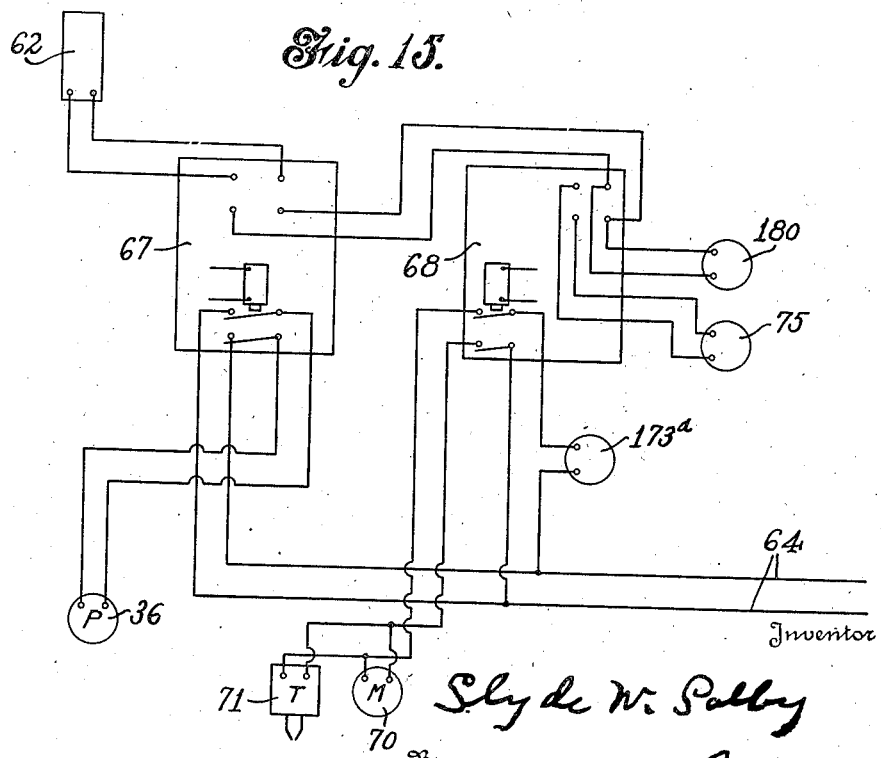
Fig. 15 is a diagrammatic view of the electrical devices and connections employed in the system shown in Fig. 13.

In Figs. 13 to 15 of the drawings I have shown a further modification of my invention in which the heating system is generally like that shown in Figs. 10 to 12, but differs therefrom in some respects. As these two forms of my invention have many identical features in common, I have employed the same reference characters on Fig. 13 to indicate the parts identical with those on Fig. 10, and further description thereof will be unnecessary.

In this form of my invention I have eliminated the radiator air venting devices shown at 149ª in Fig. 10, and have provided instead means for draining or clearing out each radiator individually. To effect this result the pipes 150 leading from the radiators 149 to the return header 151 are provided with shut-off valves 175, so that communication of the pipes 150 with the header may be shut off or opened as desired. Preferably these valves will be capable of a variable adjustment so as to permit any desired rate of flow from the radiator to the header to restrict this flow to any extent or to shut it off entirely. As shown in Fig. 14, these pipes 150 leading to the return header are provided above the valves 175 with branches 176 leading to a vent header 177, the communication of the pipes with the vent header being controlled by shut-off valves 178. The vent header is connected through a pipe 179 with the pipe 166 leading to the drain of the system.

It will be apparent that with this arrangement if one of the radiators becomes filled with air or sediment, or if it is desired to drain it for any other reason, the valve 175 is closed and the valve 178 is opened, whereby the particular radiator with which these valves are connected will be drained through the pipe 176, fresh water entering the radiator from the supply header through the pipe 148 in the usual manner. This will serve to drain the old water from the radiator, and it will carry with it any sediment or air which may have lodged therein.

The present form of my invention also differs from the form shown in Figs. 10 to 12 in the control of the burner. It will be recalled that in the latter case the burner was controlled through a high and low limit control member 173, which cut in the burner when the water in the system reached a certain minimum temperature, and cut out the burner when the water reached a certain maximum temperature, whether the lowering of the temperature was caused by radiation from the radiators or by the drawing of hot water for domestic use. In the present form of my invention, however, the control of the burner is accomplished by a pressure control device 180 connected to the domestic hot water line 160 by the pipe 181. The pressure device 180 is of well-known form in that it will operate when the pressure in the pipe 160 reaches a minimum figure to cut in the burner of the furnace, and will also serve to cut out the burner when the pressure in pipe 160 reaches a certain maximum figure. Thus, if domestic hot water is drawn from the system through pipe 160, the pressure will fall to such an extent as to set the burner in operation, and it will be continued in operation until the hot water faucet is shut off, at which time the normal pressure in pipe 160 will be restored, and the pressure control device 180 will operate to cut off the burner of the furnace.

It will, of course, be understood that the burner is also controlled in its operation by the usual room thermostat, so that in addition to being cut in and out when the pressure in the system falls or rises, it will also be cut in or out when the house or room thermostat calls for heat. In this form of my device I do not have any lower limit control, so that the water is not maintained at any given temperature. As the heating of the water is practically instantaneous, no hot water storage is necessary.

Also in this form of my invention I employ an upper limit safety control 173ª connected to the thermometer 171 by the pipe 172. This control acts as a safety to prevent the system becoming overheated, and will serve to cut off the burner when the water in the system reaches a certain maximum temperature.

A check valve 182 is placed in the city water supply line adjacent the point at which it is connected to the heating system, so that this check valve will lie between any other water supply line, such as a cold water supply for the building in which the heating system is installed, and the heating system itself. This valve permits the water to pass to the heating system freely under the pressure of the city water supply, but will prevent the return of the water in the system to the supply pipe. This prevents the drawing of cold water in the house, for example, from affecting the pressure in the heating system, for, if the valve were not present a drawing of cold water might so lower the pressure in the system that the burner would be set into operation, although no hot water had been drawn from the system and no heat was required. It will, of course, be understood that the burner in this case is operated by a room thermostat in the same manner as in previous modifications, in addition to being operated by the pressure device 180.

Preferably the clapper of the valve 182 will be pierced, as shown at 182ª, so that, while the valve will prevent any sudden reduction of pressure in the system due to the drawing of hot water, it will, nevertheless, allow the water in the heating system to expand slowly into the water supply pipe as pressure builds up in the heating system due to expansion with the rise in temperature of the water in the system.

In Fig. 15 of the drawings I have shown a diagrammatic view of the control and wiring system of the form of my invention shown in Fig. 13. As this wiring diagram is in substance like that shown in Fig. 7, it will not be necessary to give a detailed description thereof, but it will suffice to say that 62 represents the house thermostat, 64 the line wires of the source of current, 70 the motor of the oil burner, 71 the transformer of the ignition system of the burner, 36 the circulating pump, and 67 and 68 relays for the connection of the various control apparatus. The visaflame device is indicated diagrammatically at 75, and the pressure control device at 180, and the high limit temperature control at 173ª. It will be obvious that in this form the two aquastats 60 and 61 shown in Fig. 7 have been omitted, and the devices 173ª and 180 substituted therefor.

While I have shown and described some preferred embodiments of my invention, it will be understood that it is not to be limited to all of the details shown, but is capable of modification and variation within the spirit of the invention and within the scope of the appended claims.

What I claim is:

1. A heating system comprising heating means and a fluid circuit, said circuit comprising heating elements exposed to the heat of said heating means and radiation elements to transfer the heat to a surrounding medium, and delivery and return conduits connecting said heating and radiation elements, a pump to induce a flow of fluid in said circuit, and a source of fluid supply in constant communication with said circuit between said pump and said heating elements, said circuit having a hot water take-off from the delivery conduit between said heating elements and said radiation elements, and means to mix cold water from said water supply with the hot water so drawn from the circuit.

2. A heating system comprising heating means and a fluid circuit, said circuit comprising heating elements exposed to the heat of said heating means and radiation elements to transfer the heat to a surrounding medium, and delivery and return conduits connecting said heating and radiation elements, a pump to induce a flow of fluid in said circuit, a source of fluid supply in constant communication with said circuit between said pump and said heating elements, said circuit having a hot water take-off from the delivery conduit between said heating elements and said radiation elements, and means to prevent circulation through said radiation elements when hot water is withdrawn from the system through said take-off.

3. A heating system comprising heating means and a fluid circuit, said circuit comprising heating elements exposed to the heat of said heating means and radiation elements to transfer the heat to a surrounding medium, and delivery and return conduits connecting said heating and radiation elements, a pump to induce a flow of fluid in said circuit, and a source of fluid supply in constant communication with said circuit, said circuit having a hot water take-off from the delivery conduit between said heating elements and said radiation elements, means to mix cold water from said water supply with the hot water so drawn from the circuit, and means to prevent circulation through said radiation elements when hot water is withdrawn from the system through said take-off.

4. A heating system comprising heating means and a fluid circuit, said circuit comprising heating elements exposed to the heat of said heating means and radiation elements to transfer the heat to a surrounding medium, and delivery and return conduits connecting said heating and radiation elements, a pump to induce a flow of fluid in said circuit, and a source of fluid supply in constant communication with said circuit, said circuit having a hot water take-off from the delivery conduit between said heating elements and said radiation elements, means to mix cold water from said water supply with the hot water so drawn from the circuit, means to prevent circulation through said radiation elements when hot water is withdrawn from the system through said take-off, and a check valve between said source of fluid supply and said circuit to prevent a return flow of the water from said circuit toward said supply upon a reduction of pressure in the latter.

CLYDE W. COLBY